United States Patent
Art et al.

(10) Patent No.: US 12,437,945 B2
(45) Date of Patent: Oct. 7, 2025

(54) METHOD OF MAKING A CURRENT BREAKER

(71) Applicant: ASTOTEC AUTOMOTIVE GMBH, Hirtenberg (AT)

(72) Inventors: Wolfgang Art, Neudoerfl (AT); Dietmar Haba, Baden (AT)

(73) Assignee: ASTOTEC AUTOMOTIVE GMBH, Hirtenberg (AT)

(*) Notice: Subject to any disclaimer, the term of this patent is extended or adjusted under 35 U.S.C. 154(b) by 337 days.

(21) Appl. No.: 17/794,186

(22) PCT Filed: Feb. 24, 2021

(86) PCT No.: PCT/AT2021/060059
§ 371 (c)(1),
(2) Date: Jul. 20, 2022

(87) PCT Pub. No.: WO2021/168493
PCT Pub. Date: Sep. 2, 2021

(65) Prior Publication Data
US 2023/0037447 A1    Feb. 9, 2023

(30) Foreign Application Priority Data
Feb. 24, 2020    (AT) ................. A50134/2020

(51) Int. Cl.
*H01H 39/00* (2006.01)
*B29C 45/14* (2006.01)
(Continued)

(52) U.S. Cl.
CPC ....... *H01H 39/006* (2013.01); *B29C 45/1418* (2013.01); *B29C 45/14221* (2013.01);
(Continued)

(58) Field of Classification Search
CPC .......... B29C 45/1418; B29C 45/14221; B29K 2995/0005; B29L 2031/3443;
(Continued)

(56) References Cited

U.S. PATENT DOCUMENTS 4,965,933 A * 10/1990 Mraz ...................... H05K 3/202
                                                                29/418
5,038,468 A *  8/1991 Wanatowicz ...... H01H 11/0056
                                                                29/882
(Continued)

FOREIGN PATENT DOCUMENTS

DE    10065535 C2 *  8/2002 ....... B29C 45/14639
DE    10248392 A1 *  5/2004 ....... B29C 45/14221
(Continued)

Primary Examiner — Atul P. Khare
(74) Attorney, Agent, or Firm — Andrew Wilford

(57) ABSTRACT

A current breaker for automotive safety systems has a separating punch and a conductor formed with at least one localized decrease in thickness constituting a weakened separating point severable by the separating punch. This current breaker is made by overmolding the conductor in a plastic-injection mold with an encapsulation by a method having a first step of forming the separating point of the conductor in the plastic-injection mold before or during overmolding and a second step of forming with the mold above and below the conductor in the encapsulation a passage fully exposing the separating point and dimensioned to hold the separating punch.

8 Claims, 2 Drawing Sheets

(51) Int. Cl.
*H01H 9/30* (2006.01)
*B29L 31/34* (2006.01)
*H01H 85/00* (2006.01)

(52) U.S. Cl.
CPC ......... *B29C 45/14549* (2013.01); *H01H 9/30* (2013.01); *B29L 2031/3481* (2013.01); *H01H 2039/008* (2013.01); *H01H 2085/0034* (2013.01); *H01H 2229/044* (2013.01)

(58) Field of Classification Search
CPC ..... B29L 2031/3481; B29L 2031/3493; H01H 9/30; H01H 35/006; H01H 2229/044; H01H 2229/046; H01H 2229/047; H01H 2229/048; H01H 11/0056; H01H 2085/0034; H01R 43/24
See application file for complete search history.

(56) References Cited

U.S. PATENT DOCUMENTS

| | | | | |
|---|---|---|---|---|
| 6,004,160 | A * | 12/1999 | Korsunsky | H01R 43/24 439/736 |
| 6,100,784 | A | 8/2000 | Hofsaess | |
| 6,402,495 | B2 * | 6/2002 | Soga | B29C 45/14639 425/297 |
| 7,205,879 | B2 * | 4/2007 | Kordel | H01H 39/006 337/401 |
| 7,239,225 | B2 * | 7/2007 | Tirmizi | H01H 39/006 337/30 |
| 10,418,212 | B2 | 9/2019 | Warenits | |
| 10,431,406 | B2 | 10/2019 | Gaudinat | |
| 10,971,318 | B2 | 4/2021 | Sakai | |
| 11,908,647 | B2 * | 2/2024 | Haba | H01H 9/30 |
| 2019/0051478 | A1 * | 2/2019 | Warenits | H01H 39/006 |
| 2020/0258705 | A1 | 8/2020 | Tomohide | |
| 2024/0222053 | A1 * | 7/2024 | Marker | H01H 39/006 |

FOREIGN PATENT DOCUMENTS

| | | | | |
|---|---|---|---|---|
| DE | 102006032605 A | | 11/2007 | |
| DE | 102006032605 A1 * | | 11/2007 | ........... H01H 35/006 |
| DE | 102010064351 A1 * | | 3/2012 | ......... H02K 11/0141 |
| EP | 590644 A1 * | | 4/1994 | ....... B29C 45/14221 |
| EP | 0863527 B1 * | | 6/2004 | ......... H01H 37/5427 |
| EP | 1492139 A1 * | | 12/2004 | ........... H01H 39/006 |
| EP | 1883091 A1 * | | 1/2008 | ........... H01H 39/006 |
| WO | WO-2005025832 A2 * | | 3/2005 | ....... B29C 45/14221 |
| WO | WO-2015117998 A2 * | | 8/2015 | ........... H01H 39/006 |
| WO | WO-2017066816 A1 * | | 4/2017 | ........... H01H 39/006 |
| WO | WO-2019054262 A1 * | | 3/2019 | ............. H01H 39/00 |
| WO | WO-2019054263 A1 * | | 3/2019 | ............. H01H 39/00 |
| WO | WO-2021007604 A1 * | | 1/2021 | ............. H01H 39/00 |
| WO | WO-2021207773 A1 * | | 10/2021 | ....... B29C 45/14549 |
| WO | WO-2023141668 A1 * | | 8/2023 | ......... B29C 45/0025 |

* cited by examiner

METHOD OF MAKING A CURRENT BREAKER

CROSS REFERENCE TO RELATED APPLICATIONS

This application is the US-national stage of PCT application PCT/AT2021/060059 filed 24 Feb. 2021 and claiming the priority of Austrian patent application A50134/2020 itself filed 24 Feb. 2020.

FIELD OF THE INVENTION

The present invention relates to a method of making a current breaker for automotive safety systems in which a conductor has at least one weakened separation point and the current breaker is made by overmolding the conductor in a plastic injection mold.

STATE OF THE ART

An electric vehicle requires safe shutdown after an accident to avoid short circuits that may otherwise lead to a fire of the battery. This object is reliably achieved by a pyrotechnic current breaker whose conductors belong to the most expensive individual components of the current breakers. The conductor carries the current during normal operation and opens the electrical connection on command in the millisecond range. This demands a great deal from the manufacture and further processing of the conductor in order to arrive at the desired result, because on the one hand the conductor should have a large cross-section, that is to say be relatively thick so that it has little electrical resistance, and on the other hand it should be relatively thin in the region of the separation point so that it can easily be severed. The currently used conductors are either stamped parts or milled parts that can only be made in a very complex manner and have limited mechanical strength.

According to WO 2015/117998 [U.S. Pat. No. 10,431,406] of Autoliv the current breaker described therein can be assembled by encapsulation of the conductor. The geometry of the separation point seen in the drawings of this document suggests the manufacture of the weakened region by a roller milling cutter in front of the overmolding.

DESCRIPTION OF THE INVENTION

It is an object of the present invention to provide a more cost-effective way of making such a current breaker.

SUMMARY OF THE INVENTION

In order to attain this object, it is proposed to make the separating point or the separating points of the conductor in the plastic-injection mold in the method mentioned above before or during overmolding.

In contrast to the previously customary manufacturing process, according to the invention the (at least one) separating point is made directly in the plastic-injection mold, so as a result the previously necessary additional milling operation or punching operation can be dispensed with. Furthermore, the advantage is that the weakened conductor no longer has to be transported, because during transport it can easily be damaged due to its low mechanical strength.

The solution according to the invention can be realized in two ways: on the one hand, the separation point can take place directly by embossing or displacing a region of the conductor in the injection position, preferably by the closing movement of the plastic-injection mold. As an alternative to this, the embossing or displacement can also take place in the preheating zone of the plastic-injection mold. In both cases, transport of the weakened conductor to the location of the processing becomes unnecessary.

BRIEF DESCRIPTION OF THE DRAWING

The present invention is explained in more detail with reference to the accompanying drawing in which.

WAY OF CARRYING OUT THE INVENTION

Figure 1:
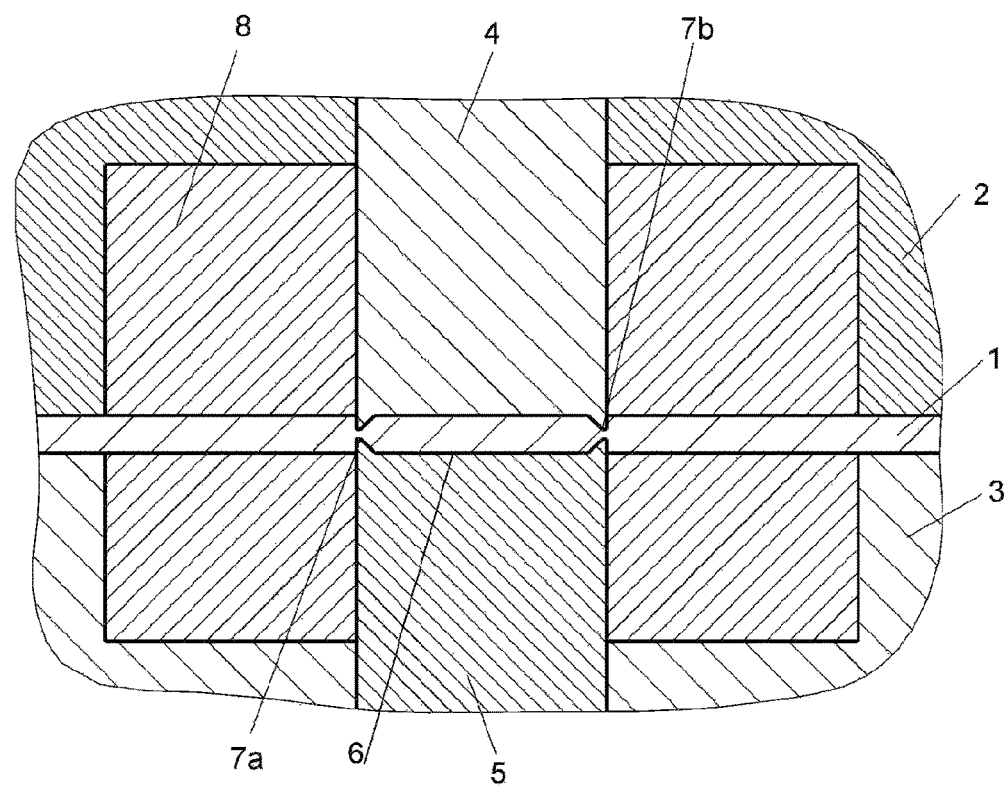
FIG. 1 shows the manufacturing process in the injection mold.

A conductor 1, for example a copper strip, is inserted into a plastic-injection mold 2, 3 and it is closed. The strip could also be of a copper alloy, aluminum, or an aluminum alloy. Two cores 4, 5 emboss break points 7a and 7b in the form of notches by closing the plastic-injection mold 2, 3 on both sides of a central region 6 of the conductor 1 with ends of the conductor 1 projecting from the mold 2,3 and each formed with a respective bore 10 forming a fixing element. This central region 6 is often referred to as the plate. The cores 4, 5 remain in place during injection of the plastic, for example PA 6.6 30 GF, particularly preferably with flame-retardant additives, during the final molding of an encapsulation 8. At the same time, the encapsulation 8 also forms a part with increased mechanical strength, because the predetermined breaking points 7a, 7b are embedded in the encapsulation 8. The cores 4, 5 thus have a double function: on the one hand, they form a passage for a separating punch 13 (see FIG. 2) and, on the other hand, they emboss notches 7a and 7b into the conductor 1. For embossing the notches, the two cores 4, 5 can have the same outer shape, so that the separating punch 13 also is snugly surrounded in the lower region by the encapsulation 8.

Figure 2:
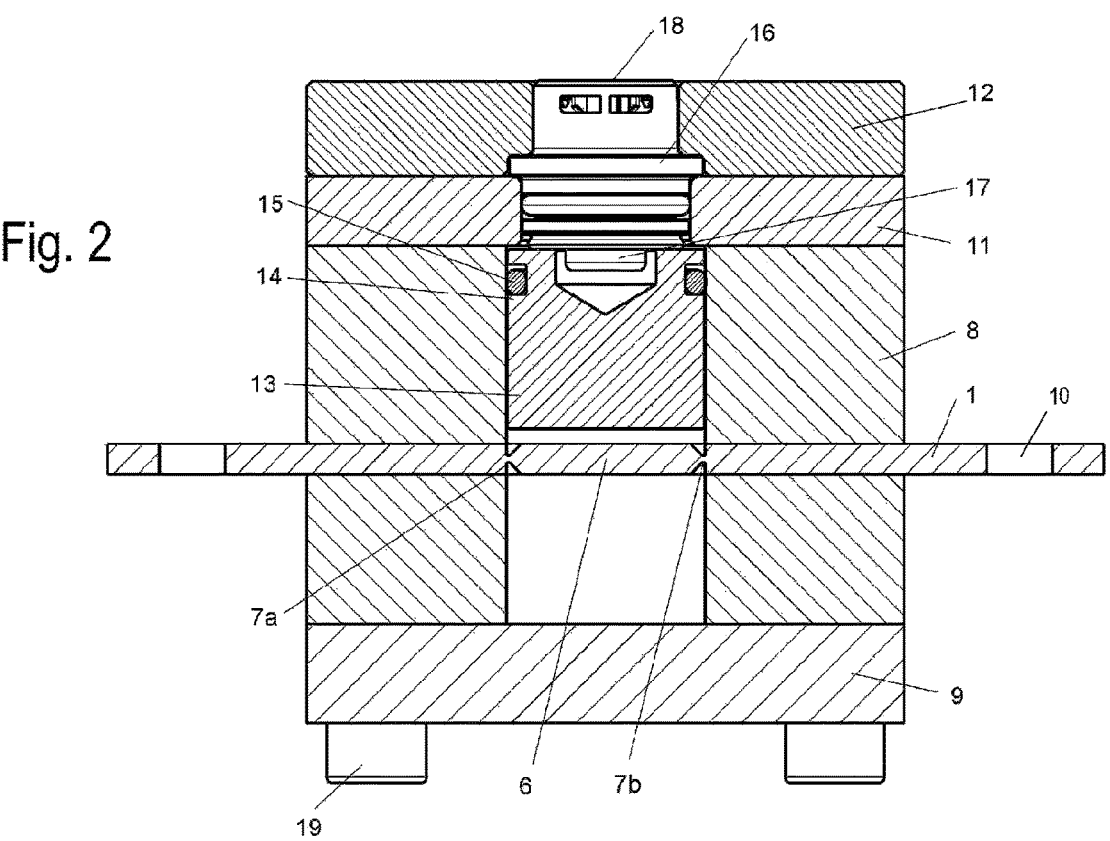
FIG. 2 shows a finished current breaker.

FIG. 2 shows a finished current breaker with such a conductor with encapsulation 8. The structure shown is closed at the top by a spacer plate 11 and an upper plate 12 and at the bottom by a lower plate 9 that are connected to one another by screws 19.

In order to separate the central conductor region 6, that is to say the plate, the provided separating punch 13 is sealed against the encapsulation 8 by an O-ring 15 in a groove 14. The separating punch 13 can be subjected to pressure by an explosive charge 17. The explosive charge 17 is held by a detonator 16, the electrical contacting is effected by a holder 18.

Ignition of the explosive charge 17 applies gas pressure to the separating plunger 13 so that it punches the central part 6 out of the conductor 1, thereby separating it from flanking side parts, and displaces it away from the explosive charge 17. Quenching of the arc takes place by the separating punch 13 and the encapsulation 8 that, as mentioned, fit snugly in the encapsulation 8. After the overmolding, a remaining residual wall thickness between the side parts of the conductor and the offset center part is at most 1 mm.

Often, an plastic-injection mold is equipped with a preheating zone. In this case, the conductor 1 is preheated by the waste heat of the injection process for another conductor; after the injection process, the overmolded conductor 1 is removed from the plastic-injection mold, and the next preheated conductor 1 is brought into the injection-molding position; a further, cold conductor 1 is placed in the pre-heating zone. Thereafter, the next injection molding operation follows. In this way, waste heat is utilized to preheat the conductors 1 to be overmolded. This preheating ensures that the overmolded plastic material adheres well to the conductor.

In this latter embodiment, the predetermined breaking point or the predetermined breaking points can be made in the preheating zone of the plastic-injection mold. The mechanically stable conductor 1 without predetermined breaking points is inserted into the plastic-injection mold and only embossed or offset in the preheating zone. A short movement is enough to transfer the conductor to the injection position where it is overmolded to form a molded part that can be handled easily.

Figure 3:
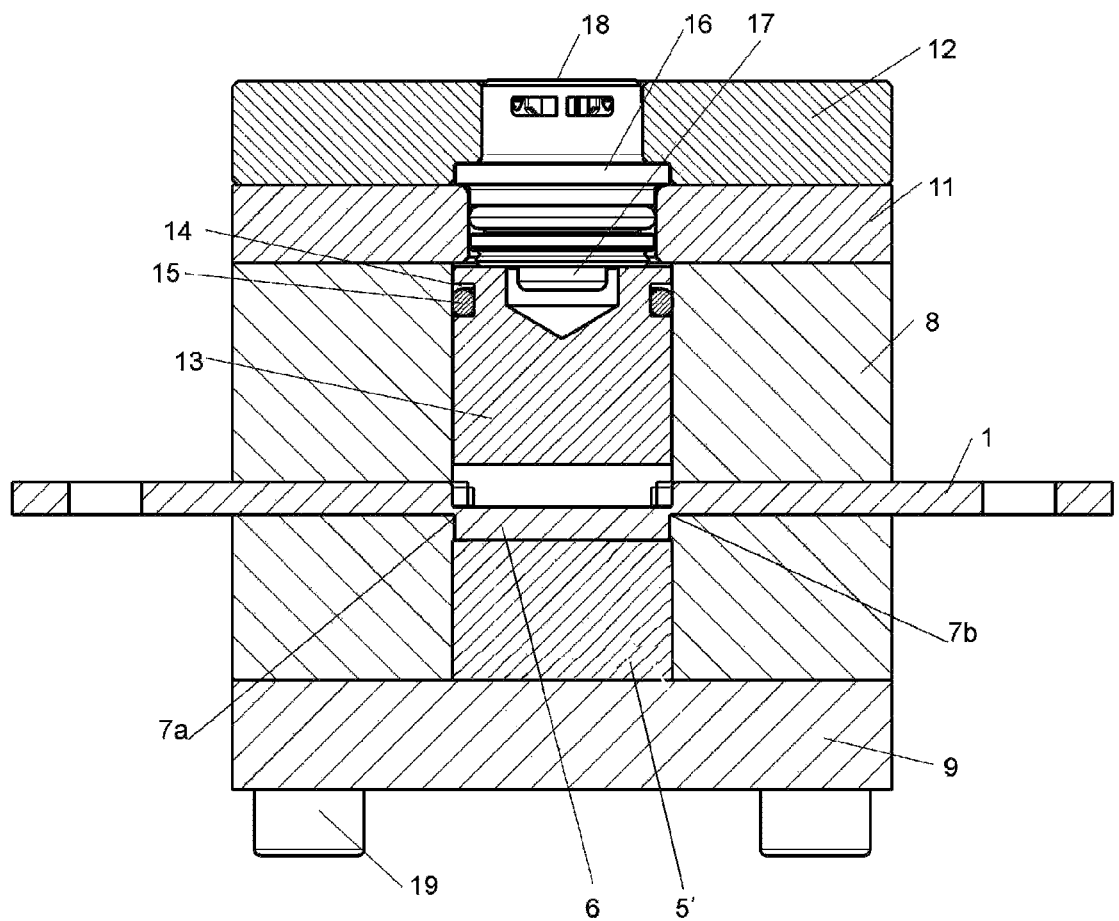
FIG. 3 shows another embodiment of a finished current breaker.

FIG. 3 shows a current breaker with a conductor 1, in which the predetermined breaking points 7a, 7b have been made in that the central region 6 of the conductor 1 has been offset. For this purpose, the lower core must have a somewhat larger cross-section than the upper core. If the embossing takes place in the plastic-injection mold, this results in the separating punch 13 having a spacing from the encapsulation 8 in the lower region, so that an arc arising during the separation is not choked.

If, however, the embossing takes place in the preheating zone, it is possible to use cores for the molding that have the same outer contour adapted to the offset plate and the separating stamp 13, so that a good clamping of the arc between the separating stamp 13 and the encapsulation 8 after the separation of the plate is achieved.

The mode of operation is analogous to the variant described above with the manufacture of notches in the plastic-injection mold: upon ignition of the explosive charge 17, the separating punch 13 is subjected to pressure and punches the central part 6 out of the conductor 1 and displaces it away from the explosive charge 17. The arc is extinguished by choking between the separating punch 13 and the encapsulation 8.

The invention claimed is:

1. A method of making a current breaker for automotive safety systems having a separating punch, the method comprising the steps of:
   positioning a conductor and two cores in a mold,
   overmolding the conductor and the cores in the mold with an encapsulation while forming with the cores passages extending oppositely away from a central part of the conductor in the encapsulation,
   with the cores in the passages, forming the overmolded conductor in the mold with a localized decrease in thickness constituting a weakened separating point during the overmolding, and
   removing the cores from the passages and then providing in one of the passages a separating punch for severing the conductor at the separating point.

2. The method according to claim 1, wherein the separating point is made by closing the plastic-injection mold with the cores.

3. The method according to claim 2, wherein the separating point is made by displacing a center part of the conductor relative to flanking side parts thereof with the cores.

4. The method according to claim 3, wherein after the overmolding a remaining residual wall thickness between the side parts of the conductor and the offset center part is at most 1 mm.

5. The method according to claim 2, wherein the cores form respective spaces flanking the conductor in the encapsulation and form the passages.

6. The method according to claim 1, wherein the conductor is made of copper, a copper alloy, aluminum or an aluminum alloy.

7. The method according to claim 1, further comprising the step of:
   before the encapsulation, forming bores in the conductor.

8. The method according to claim 7, wherein the bores extend through the conductor.

* * * * *